UNITED STATES PATENT OFFICE.

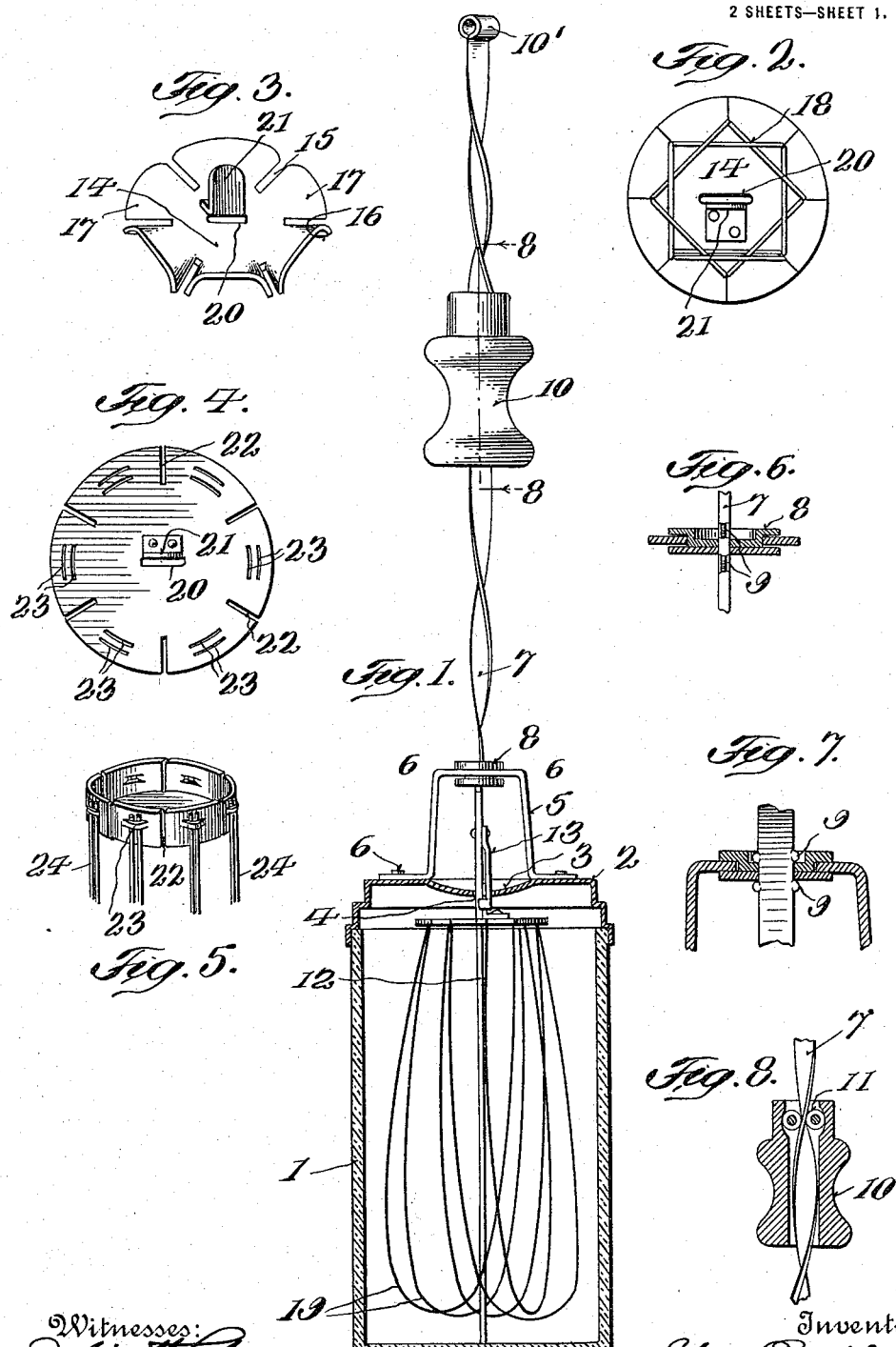

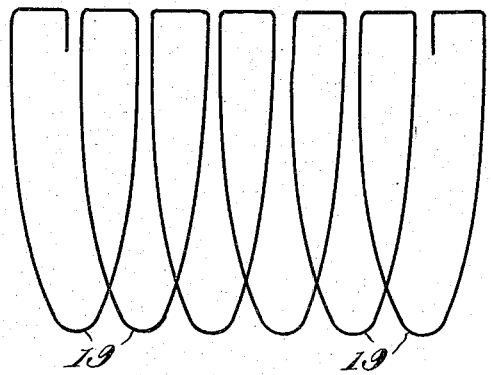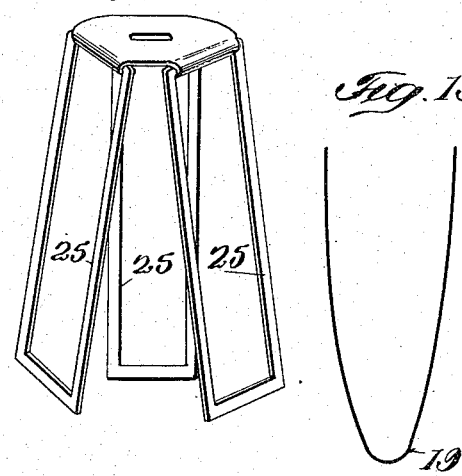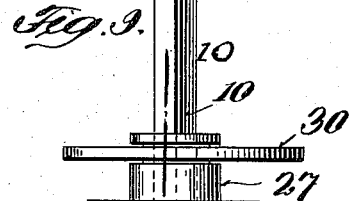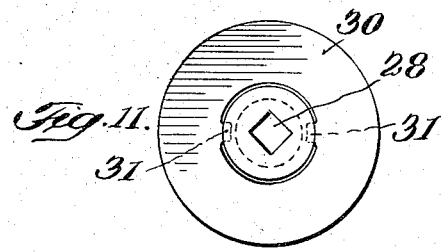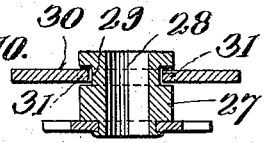

EDWIN BALTZLEY, OF WEEHAWKEN, NEW JERSEY, ASSIGNOR TO EDWARD D. FARMER, TRUSTEE, OF MONTCLAIR, NEW JERSEY.

CULINARY BEATER.

1,165,307.   Specification of Letters Patent.   Patented Dec. 21, 1915.

Application filed September 11, 1913. Serial No. 789,269.

*To all whom it may concern:*

Be it known that I, EDWIN BALTZLEY, a citizen of the United States, residing at Weehawken, in the county of Hudson and State of New Jersey, have invented certain new and useful Improvements in Culinary Beaters, of which the following is a specification.

This invention relates to culinary beaters, and has for its objects the production of a food beater wherein revolving whips adapted to expand by centrifugal force and such as are shown in my Patent No. 332,375, granted December 15, 1885, may be used in combination with the usual cylindrical fruit jar now to be found on the market; the production of a beater of the class described in which the parts are separable, particularly the whip and beater-head, the two being so arranged as to be easily detached from and assembled with the motion transmission mechanism; the production of a beater in which the whips are slidably maintained in contact with the motion transmitting mechanism and in which the whips in use may rest upon the bottom of the jar in which they are being used or may be elevated and lowered thereon by hand during operation; the production of a beater in which reverse rotating movement may be imparted to the whip through an efficient motion transmitting mechanism; the production of whipping mechanism in a culinary beater, which mechanism may be adapted for use in combination with containers of different sizes; and the production of a convenient, particularly inexpensive and efficient apparatus of the class described.

With these and other objects in view, my invention comprises a whip carrier or beater-head having a whip of arms or fingers, preferably, but not necessarily, made of wire and adapted to spread upon centrifugal motion being imparted thereto, in combination with a cylindrical jar, and mechanism for imparting a reverse rotary movement thereto. Continuous rotary movement of whips similar to those shown in my patent referred to in cylindrical jars results in a centrifugal motion of the cream, batter, eggs or other material being whipped, with a result that there is a tendency for such material to overflow the edges of the receptacle. In actual use I have found that it is necessary to provide a square jar to overcome this tendency with the use of the beaters above described, which jar is relatively more expensive than a cylindrical jar and which has necessarily to be especially made to accommodate the particular beater. I have found that rotary reverse movement in a cylindrical jar obviates the disadvantages mentioned and particularly so if the beating whips are arranged to bear directly against the bottom of such cylindrical receptacle. I preferably transmit the reverse rotary movement to the whip through a reciprocating handle in order that I may produce a very simple and a comparatively light article when the parts are assembled and so that no stand or support is necessary in operation, it being possible and desirable in operating my new culinary beater in one form to hold the jars in one hand and to revolve the whips through a reciprocating movement of the handle by the other hand. I have also found it desirable for ease of operation to provide a reciprocatory handle with rotary bearings arranged to travel against the rod included in the motion transmitting mechanism, and I deem this arrangement of bearings and the particular rod used as one of the important features of my invention.

In large beaters, and particularly those which are operated by motors, it is frequently desirable to move the whips vertically in the jars during operation in order that the contents may be more thoroughly whipped and also to provide a way in which the jar may be placed on a permanent stand when the motion of transmitting rod or shaft is permanently secured to the motor.

The invention, therefore, comprises means for accomplishing this, in one form of my invention shown as a connection between the motion transmitting mechanism and the beater whereby the beater may be temporarily held in any position upon such mechanism by hand and whereby when a fixed rod is used the jar may be entirely removed or placed upon a shelf under the end of the rod and the whip allowed to slide thereon, all as more fully hereinafter set forth and as claimed.

In the accompanying drawings showing several forms of a specific embodiment of my invention and in the several views of which similar reference numerals indicate corresponding parts: Figure 1 is a view partly in section and partly in elevation of a complete culinary beater; Fig. 2 is a top plan view of the beater-head after the beating wires or whip have been assembled according to one method of manufacture; Fig. 3 is a detail perspective of the beater-head before the whip has been attached, and serves to illustrate the method of attaching the whips according to one form; Fig. 4 is a top plan view of the blank of the beater-head made in accordance with another form and shows the same before it has been formed or cupped; Fig. 5 is a detail segmental perspective of the form shown in Fig. 4 completed to secure the whips; Fig. 6 is a horizontal section along line 6—6 of Fig. 1; Fig. 7 is a similar enlarged section taken at right angles thereto; Fig. 8 is a vertical section along line 8—8 of Fig. 1; Fig. 9 is an elevation of a different form of beater to be used in connection with a motor or the like (not shown); Fig. 10 is a vertical section through line 10—10 of Fig. 9; Fig. 11 is a top plan view of the beater-head shown in Fig. 9 detached; Fig. 12 is a plan view of the form of whip used in connection with the beater-head shown in Figs. 2 and 3; Fig. 13 is one form of whip used in connection with the beater-head shown in Figs. 4 and 5; and Fig. 14 is a perspective view of a still different form of beater-head and whip which may be used in the beater shown in Fig. 1.

Referring to the drawings, reference numeral 1 designates a cylindrical jar of the type now to be found upon the market usually used for preserving fruits and the like. The beater may be sold with or without this jar, but one of the main advantages of the construction is that it may be used in connection with this type of jar.

The beater proper comprises a cap 2 which may be stepped as shown a plurality of times in order that it may be used in connection with jars having mouths of different sizes. The top is dished, as at 3, to collect any contents of the jar which may splash or flow through the opening 4 which allows the operating handle to enter the top. The material which may be collected in this slightly dished portion flows back into the receptacle through this opening. The top is provided with upwardly extending arms 5 riveted or otherwise attached, as at 6, and forming a bracket or support for the bearing. The Archimedean screw or motion transmitting mechanism 7 is provided with a bearing 8 in the form of a collar which is secured in position by the swaged portion 9 of the rod. 10 is the operating handle which is slidably arranged upon this rod and which carries a plurality of roll bearings 11 having their faces in contact with the flat sides of the rod and being suitably journaled in the handle. Figs. 6 and 7 clearly show the construction of the bearing for the rod and Fig. 8 illustrates the construction of the handle with its roll bearings.

At one end the rod is provided with some means to prevent the handle 10 from becoming detached, such, for instance, as the turned over or enlarged portion 10', serving also as a stop to limit the upward movement of the handle. The downward movement may be limited by the bearing 8 and the bracket 5. At its lower end the rod is provided with means for securing the beater-head either in slidable or fixed position. These means are here shown as a straight portion 12 of the rod upon which the beater-head may slide and a spring catch 13 riveted to the rod which coöperates with a corresponding portion of the beater-head.

The beater-head may be made in several different forms and for the purposes of exposition I have shown three types of such heads. Figs. 2 and 3 show one construction wherein the head 14 before the whips are attached comprises a stamped out circular piece of metal having the slits 15 and turned down ends 16 forming a plurality of separated tongues 17. To assemble the wire whip to this form of beater-head, wire wound in the shape shown in Fig. 12 is inserted, as is shown at 18 in Fig. 2, and the head, then in the form shown in Fig. 3, is placed between two dies and the curved tongues are flattened, whereupon the edges 16 bite the wire and hold it securely in the position shown in Fig. 1. The wire is formed as shown in Fig. 12 by winding it upon a mandrel having approximately the shape of one of the loops. The wire, being preferably fine "piano" wire, is, of course, very resilient, and when the flattened portions 18 are confined in the position shown in Fig. 2 the lower extremities 19 tend to flare or spread from a common center. The wire when in position crosses itself at several different points and thus in effect reinforces the whole whip. When the whip is to be used in a jar which may be carried about it is desirable that it should contact with the bottom thereof, especially if a small amount of food is to be whipped, and for this purpose the beater-head is provided with a central slot 20 corresponding to the flattened or straight portion 12 of the operating rod, and so that the beater-head may freely move up and down on the rod. Movement of the handle 10 in a vertical direction rotates the spiral rod and thus also the whip through its slidable connection to the beater-head and rod. When it is desired to secure the beater-head to the rod the tongue 21 may be inserted under the spring catch 13 and against the flattened portion 12. Ordinarily, however, the catch and tongue are not necessary for successful operation of the device. The spring catch is only used when it is desired to firmly secure the whip to the rod to be used in large open bowls and the like.

In Figs. 4 and 5 I have shown another form of beater-head and I have illustrated the manner in which wires, such, for instance, as are shown in Fig. 13, may be secured in position. Fig. 4 shows this form of beater-head as it is stamped from sheet metal and before it is shaped into cup form. It is provided with the slot 20 and, if desired, the tongue 21, as is the other beater-head described. It also is stamped in such manner that a plurality of tongues 17 separated by slits 15 result. On the faces of each of the tongues two parallel segmental slots 22 are provided. These tongues 17 are turned up to the position shown in Fig. 5 and the metal between the slots 22 is stamped out, as is shown at 23. The extremities 24 of one loop are inserted in the space made by stamping the slots and the metal as described and then the section 23 of each tongue is flattened against the wires to hold them in position. This construction and method of manufacture of the beater-head and whip is a preferred construction and process, as it is relatively inexpensive as compared to the construction and process previously described, particularly because the wires do not have to be previously wound upon a mandrel to a definite form.

Fig. 14 illustrates an alternative form of beater. The head 14 may be provided with the usual slot 20 and the tongues 17 may be curled over depending rectangular whips 25, in this instance shown as rigid, but pivotally connected so that they may be subjected to the centrifugal influence of the rotating beater-head and tend to spread apart from a common center during rotary operation. This whip, as shown in Fig. 14, is preferably stamped from sheet metal, and, while it is shown here as a simple rectangle, it may have many other forms, and with lacing strips or configurations between its side strips.

In the art where relatively large beaters are used, such as the baking art, kneaders or mixers are operated by motors. In Fig. 9 I have shown a form of beater for use in such an art. In this instance the jar 1 may be rectangular in cross section and it may be supported by suitable shelf or table (not shown). The rod 26 is rectangular in cross section (or any other suitable shape) and is geared or otherwise connected through an operating motor (not shown). If this rod 26 extended below the top of the vessel it would be impossible to put the vessel upon a shelf or table, and, therefore, I provide means whereby the whip may be elevated on the rod above the top of the vessel. These means may also be used to raise and lower the beater whip during operation, if desired. A beater-head of any of the forms shown is keyed to a bushing 27 which has the rectangular opening 28 so that it may rotate with the rod 26 upon which it is slidably arranged. This bushing is recessed, as at 29, for the reception of a collar 30, which collar may be provided with spring tangs 31 adapting it for connection in the recess of the bushing. To secure the collar in place it is merely forced down over the top of the bushing until these spring tangs engage the walls of the recess. Aside from the advantages of this construction above pointed out, the whips, when used in connection with a motor, may be readily cleaned, as the jar can be removed, and the whips may then be revolved at a great rate of speed, the centrifugal force serving to throw off any adhering particles.

The lower flattened portion of the operating rod may be longer than the whips, so it may rest on the bottom of the jar or bowl, and thus steady the apparatus when no top is used, the whips, however, being free to slide on such flattened portion and to engage the inner wall of the jar or bowl at points very near the bottom.

It may thus be seen that I have provided a culinary beater in which the operating means may be readily removed from the whip and the whip, comprising a few number of simple parts, may be easily and thoroughly cleansed. The practical and efficient means I employ for attaining the reverse rotary movement enables me to manufacture and sell this culinary beater at a relatively small price. The beaters made in accordance with my Patent No. 332,375 usually cost as high as one dollar apiece, whereas the beater made in accordance with the present invention under prevailing manufacturing conditions may be made and sold to the public in some forms at about one-third that price, and this is possible through the use of a few number of parts and the simplicity thereof.

I do not limit the invention to the exact forms shown in the accompanying drawings, as such drawings are illustrations only and merely serve to show several types. Different modifications may be made and different arrangements of parts may be resorted to without departing from the invention, and I consider myself entitled to all modifications, arrangements and equivalents within the scope of the following claims.

What I claim is:

1. A culinary beater comprising in combination, a rotatable twisted rod having a flat side, reciprocatory operating means on said rod for imparting reverse rotary motion thereto, a slidable beater head on said rod, and a plurality of pendant whips on said beater head.

2. A culinary beater comprising, in combination, a rotatable rod and operating means for imparting reverse rotary motion thereto, an expansible whip operated thereby and adapted to be held in expanded position by centrifugal force, a beater-head carrying said whip and slidably arranged with respect to said rod, and a vessel in which said expansible whip operates.

3. A culinary beater comprising, in combination, a rotatable rod and a reciprocating handle for imparting reverse rotary motion thereto, a whip operated thereby, a beater-head carrying said whip and having a slot for slidable engagement with said rod, and a vessel for said whip.

4. A culinary beater comprising, in combination, a rotatable rod, a beater comprising whips, and a beater-head with a slot therein for attachment of said rod, a cylindrical jar for said beater, a top for said jar, a supporting bracket for said rod carried by said top, a bearing carried by said rod and supported in said bracket and rotatable relative thereto, and a handle for imparting reverse rotary motion to said rod and thus to said whips.

5. In a culinary beater, a spiral rod and a reciprocating handle adapted to impart reverse rotary motion thereto, a whip operable by said rod and having a beater-head, said rod being flat for a portion of its length, and said beater-head having a slot therein for insertion of said flattened portion of the rod whereby the whip may be assembled on said rod in vertically slidable relation.

6. As an article of manufacture, a beater comprising a disk shaped beater-head and a plurality of whip arms secured thereto, the said beater-head provided with a slot adapting it for slidable engagement with suitable operating mechanism.

7. As an article of manufacture, a beater comprising a substantially flat beater-head formed with a multiplicity of slits therein for attaching a whip and having a slot therein for reception of an operating rod, and a whip attached in said slits to said beater-head.

8. In a culinary beater, a whip and operating means therefor comprising a spiral rod, a reciprocating handle therefor adapted to rotate the rod, and rotary bearings in said handle adapted to bear against said rod.

9. In a culinary beater, a whip and operating means therefor comprising a rod and mechanism for revolving the same, a beater-head for said whip having a loose collar forming a finger hold, and means for retaining said loose collar on the beater-head, whereby the collar, the beater head and thus the whips may be moved vertically relative to the rod while such whips and rod are rotating.

10. In a culinary beater, operating mechanism and whipping mechanism attached thereto in vertically slidable relation whereby it may rest against the bottom of the vessel in which it operates.

11. In a culinary beater, operating mechanism having means for coöperating with a catch and whipping mechanism attached thereto in vertically slidable relation, said whipping mechanism provided with a catch for coöperating with said means, whereby said whipping mechanism may be maintained on said operating mechanism either in vertically slidable relation or permanently in one position.

12. In a culinary beater, a beater-head comprising a section of metal having a plurality of slits therein forming tongues, wire looped between said tongues and maintained in looped position solely thereby to provide shipping means.

13. A culinary beater comprising operating mechanism having a portion arranged for maintaining whips in slidable relation thereto, and depending whips provided with means for effecting a slidable engagement with said portion of the operating mechanism, said portion being longer than the whips whereby the extremity of said portion may rest on the bottom of a vessel, the said whips being slidable throughout the length of said portion.

14. In a culinary beater, a whip operating rod having a portion of its length twisted into spiral form, a beater head provided with a slot and carrying dependent whips, said beater head being slidably secured to the untwisted portion of said rod in slidable relation through said slot, a reciprocatory handle mounted on the twisted portion of said rod and a container for said whips.

15. In a culinary beater, a spiral rod, a reciprocatory handle mounted on said rod and adapted to impart rotary motion thereto, whips operable by said rod and means whereby the whips may be assembled in vertical slidable relation on said rod.

In testimony whereof I have hereunto set my hand this 9th day of Sept. 1913 in the presence of witnesses.

EDWIN BALTZLEY.

Witnesses:
ALFRED M. HOUGHTON,
H. SCHOENTHAL.